United States Patent [19]
Toda et al.

[11] Patent Number: 5,143,428
[45] Date of Patent: Sep. 1, 1992

[54] WHEEL BRAKING CONTROL APPARATUS FOR REDUCING PRESSURE FLUCTUATIONS BETWEEN TWO BRAKE LINES

[75] Inventors: Hiroshi Toda, Kariya; Hideyasu Miyata, Nagoya; Hiroaki Takeuchi; Nobuyasu Nakanishi; Koichi Kondo, all of Toyota, all of Japan

[73] Assignee: Aisin Seiki K. K., Aichi, Japan

[21] Appl. No.: 589,367

[22] Filed: Sep. 28, 1990

[30] Foreign Application Priority Data

Sep. 29, 1989 [JP] Japan .................. 1-115086[U]

[51] Int. Cl.$^5$ .............................................. B60T 8/62
[52] U.S. Cl. ........................ 303/113 AP; 303/DIG. 5
[58] Field of Search ............... 303/9.62, 9.73, 9.76, 303/84.1, 84.2, 113 R, 113 P, 116 R, 116 SP, 115 R, DIG. 5

[56] References Cited

U.S. PATENT DOCUMENTS 3,521,934  7/1970  Leiber ................................. 303/119
4,778,222  10/1988  Numata et al. .................. 303/116 R

FOREIGN PATENT DOCUMENTS 3700282  7/1987  Fed. Rep. of Germany ... 303/116 R
241252  10/1986  Japan .............................. 303/116 SP
160950  7/1987  Japan .............................. 303/116 R Primary Examiner—Robert J. Oberleitner
Assistant Examiner—Alfred Muratori
Attorney, Agent, or Firm—Sughrue, Mion, Zinn, Macpeak & Seas

[57] ABSTRACT

An anti-lock brake system is arranged such that the recirculation line from the overflow reservoir feeds into one of the brake lines downstream of the lines dividing point. A constriction, which may take the form of a simple nozzle is positioned between the recirculation line junction and the brake line dividing point for reducing the coupling of pressure fluctuations between the brake lines when the anti-lock system is actuated. With this arrangement, even upon the occurrence of sharp pressure fluctuations in one of the brake lines due to actuation of the anti-lock function, the pressure of the other brake line is not affected thereby allowing proper controlled braking in each wheel.

6 Claims, 3 Drawing Sheets

WHEEL BRAKING CONTROL APPARATUS FOR REDUCING PRESSURE FLUCTUATIONS BETWEEN TWO BRAKE LINES

This application claims the priority of Japanese Utility Model Application No. 1-115086 filed Sep. 29, 1989 which is incorporated herein by reference.

BACKGROUND OF THE INVENTION

1. Field of the Invention

The present invention relates to a wheel braking control apparatus for use in vehicles, such as automobiles. More particularly, this invention relates to a wheel braking control apparatus having an antiskid (antilock brake) function.

2. Description of the Related Art

A wheel braking control apparatus having an antilock brake function or antilock brake system (hereinafter referred to as ABS) to prevent locking of wheels at the time braking is disclosed in Laid-Open Japanese Patent Publication No. 64-74153.

The antilock brake system (ABS) maintains vehicle stability during operation which is incorporated herein by reference.

This wheel braking control apparatus is constituted as shown in FIG. 3. As illustrated, a master cylinder 50, which is driven in accordance with the operation of a brake pedal B, is connected to first and second wheel cylinders 52, 53 via a solenoid operated hydraulic valve 51 and hydraulic valves 63, 64, respectively, thus forming a brake fluid circuit 54. A circulating type anti brakelock circuit 56 including a pump 55 is connected to this circuit 54 to constitute the wheel braking control apparatus.

In the brake fluid circuit 54, the first and second cylinders 53, 53 respectively apply braking to right and left wheels 57, 58 of a vehicle. Rotation sensors S1 and S2 detect rotational speed of the wheels 57, 58 and so inform A controller C. During acceleration, the controller C controls the hydraulic valves 51 to prevent the wheels 57, 58 from spinning. If the wheels 57, 58 locked at the time braking is applied, the controller C controls the hydraulic valves 63, 64 to couple the cylinders 52, 53 to a reservoir to release the pressurized brake fluid.

In the brake fluid circuit, a fluid line 62 from the pump 55, a fluid line 59 connected to the first cylinder 52 and a line 60 connected to the second cylinder 53 join at junction 61. pressurized fluid from the pump 55 is evenly supplied to the first and second cylinders 52, 53 to control the rotation of the wheels 57, 58.

In operation of the ABS (after a locked wheel has been detected), there are occasions when an attempt is made to increase the fluid pressure on both wheel cylinders. At such times, there is a tendency for the pressurized fluid to favour one of the wheel cylinders, this temporarily causes a sharp drop of the fluid pressure in the other wheel cylinder. Such an imbalance causes improper brake control, thus making the braking of the wheels unstable.

In addition, when the hydraulic valve 51 is actuated, i.e., when the traction control (TRC) is executed, the pressures in the lines communicating with both wheel cylinders interferes with each other, thus presenting the same problem on braking of the wheels.

SUMMARY OF THE INVENTION

It is therefore an object the present invention to provide a wheel braking control apparatus which can apply stable braking to the wheels when an antilock brake system, such as ABC or TRC, is activated. In association with this object, the present invention aims to provide a wheel braking control apparatus for use in vehicles, which can properly apply to the wheels without causing interference between the pressures in a pair of brake-applying hydraulic cylinders, which apply braking to brake-applying hydraulic cylinders, which apply the braking force to the wheels.

It is another object of the present invention to provide a wheel braking control apparatus for use in vehicles equipped with an antilock brake function with a simple structure to ensure stable braking.

To achieve the foregoing and other objects and in accordance with the purpose of the present invention, an antilock wheel braking control apparatus is provided. The antilock system includes a pair of brake-applying hydraulic cylinders provided in association with a pair of wheels, for applying a braking force to the respective wheels. A master cylinder supplies a pressurized fluid to the hydraulic cylinders. A brake fluid circuit couples the master cylinder to the hydraulic cylinders. The brake fluid circuit is divided into two brake lines at a dividing point, the brake lines each have an end connected to one of the hydraulic cylinders. Each brake line has a switching valve for switching communication hydraulic cylinder from the master cylinder to a relief reservoir when a wheel locking condition is detected.

A recirculation line is connected between the reservoir and the first brake lines at a junction point between the dividing point and its associated hydraulic cylinder, for delivering fluid from the reservoir to the first brake line. A constriction is positioned between the dividing point and the junction for reducing the coupling of pressure fluctuations between the first and second lines.

BRIEF DESCRIPTION OF THE DRAWINGS

The features of the present invention that are believed to be novel are set forth with particularity in the appended claims. The invention, as well as objects and advantages thereof, may best be understood by reference to the following description of the presently preferred embodiments together with the accompanying drawings in which:

DESCRIPTION OF THE PREFERRED EMBODIMENTS

Preferred embodiments of the present invention will now be described referring to the accompanying drawings.

Figure 1:
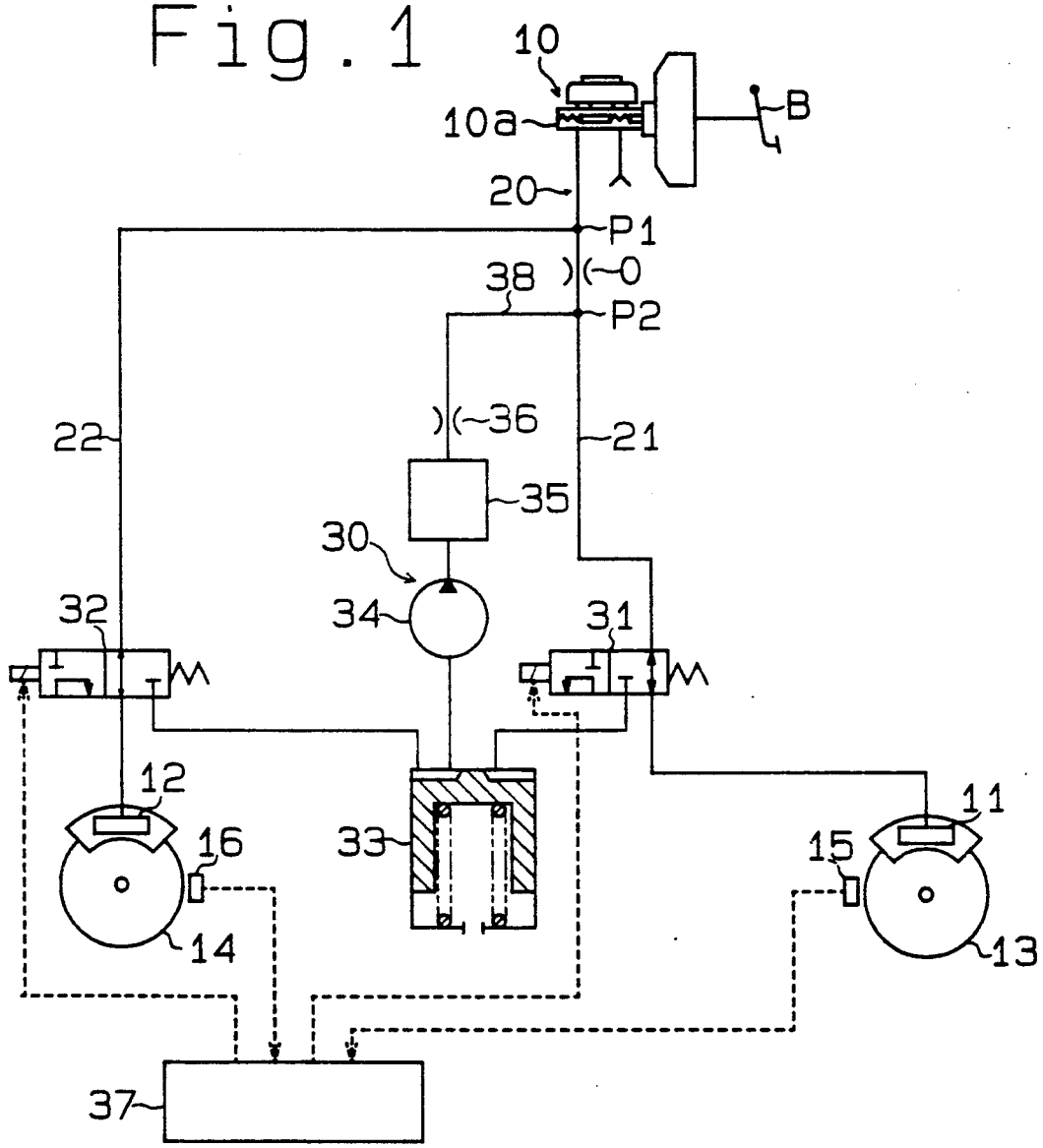
FIG. 1 is a schematic diagram illustrating the structure of one embodiment of a wheel braking control apparatus according to the present invention.

FIG. 1 illustrates a wheel braking control apparatus embodying the present invention, which has an antilock brake system (ABS) for use in vehicles.

In this apparatus, a master cylinder 10 operatively connected to a brake pedal P has a forward reservoir chamber 10a connected to a brake fluid circuit 20. This circuit 20 is divided at a dividing point P1 into two brake lines 21 and 22 to which brake applying wheel cylinders 11, 12 are respectively connected.

Rotation sensors 15, 16 detect the locking of associated wheels 13, 14 caused by the respective wheel cylinders 11, 12. A recirculation type anti brakelock circuit 30 is coupled to the brake fluid circuit 20. One of the wheels may be a left side rear wheel and the other wheel may be a right side front wheel.

The anti brakelock circuit 30 includes solenoid operated hydraulic switch valves 31, 32 respectively provided on the brake lines 21, 22, a reservoir 33 arranged in parallel to both valves 31, 32, a damper 35 and an orifice 36. The damper 35 and orifice 36 smooth the pulsation of the pump 34 to damper pressure surges within the fluid circuits.

The hydraulic switch valves 31, 32 are both of a three-port-connection and two-position type. The valves 31, 32 are excited and de-excited for duty control by a well-known method using a drive signal, which is outputted from a controller 37. The controller 37 is electrically coupled to rotation sensors 15, 16 and receives detection signals indicating the detect of locking of the wheels 13, 14. In normal operation, the hydraulic switch valves 31, 32 connect the wheel cylinders 11, 12 to the master cylinder 10, as illustrated in FIG. 1. When excited, on the other hand, the hydraulic switch valves 31, 32 disconnect the wheel cylinders 11, 12 from the master cylinder 10 and couple them to the reservoir 33. When deexcited, the communication reverts to the master cylinder 10.

The pump 34 is controlled by an electric control device 37 in such manner that, at the time the antilock brake function is in operation, the hydraulic switch valves 31, 32 are first excited, then the pump 34 is driven slightly thereafter. The pump 34 in operation sucks up brake fluid from the reservoir 33 and supplies the fluid via the damper 35 and orifice 36 back to brake lines 21, which connects the reservoir chamber 10a of the master cylinder 10 to the wheel cylinder 11.

As described above, according to this embodiment, a fluid line 38 from the pump 34 is connected to line 21 at a junction point P2 located downstream of the dividing point P1. Dividing point P1 separates the line 21 connected to the wheel cylinder 11 and the line 22 connected to the wheel cylinder 12. A nozzle O is provided between the junction point P2 and dividing point P1. The amount of throttling provided by the nozzle O is sufficient to prevent pressurized fluid from smoothly flowing into the line 22 from the line 21.

The operation of the described the wheel braking control apparatus will be described. At the time of normal braking, pressurized fluid is supplied through the nozzle O and valve 32 to the wheel cylinder 11 from the reservoir chamber 10a of the master cylinder 10 to thereby apply braking to the wheel 13, on the side of the line 21. Meanwhile, on the side of the line 22, pressurized fluid is likewise supplied through the valve 32 to the wheel cylinder 12 to apply braking to the wheel 14. At this time, the pump 34 is disabled and a check valve (not shown) of the pump 34 inhibits the pressurized fluid from being discharged to the reservoir 33.

As described above, when the pressure of the fluid on the side of wheel cylinder 12 starts increasing while the pressure of the fluid of the wheel cylinder 11 is on the increase with the ABS activated in braking the wheels 13, 14 the fluid pressure in the upstream of the nozzle O, i.e., on the master cylinder 10, is transmitted to the wheel cylinder 12. Since the supply of the compressed fluid pumped out from the pump 34 to the side of the wheel cylinder 12 is limited by the nozzle O, however, the pressure of the compressed fluid (the one discharged from the pump 34) to be supplied to the side of the wheel cylinder 11 will not sharply drop. Therefore, it is possible to properly control the pressure increase in the fluid on the side of the wheel cylinder 11 therefore the rotation of the wheel 13.

At the same time, the fluid transmitted through the line 21 to the side of the wheel cylinder 11 may rapidly drop. Since the pressure drop in the line 21 is transmitted to the upstream side by the nozzle O located upstream of the line 21, however, the pressure of the fluid on the master cylinder side transmitted via the line 22 to the side of the wheel cylinder 12 is properly maintained and does not drastically drop. It is therefore possible to properly control the pressure increase in the fluid on the side of the wheel cylinder 12 therefore the rotation of the wheel 14.

As described above, the simple addition of the nozzle O between the points P1 and P2 in a circuit that is otherwise substantially the same as a conventional one can provide significantly improved rotational control of the wheels 13 and 14 at the time of braking with the ABS activated.

Figure 2:
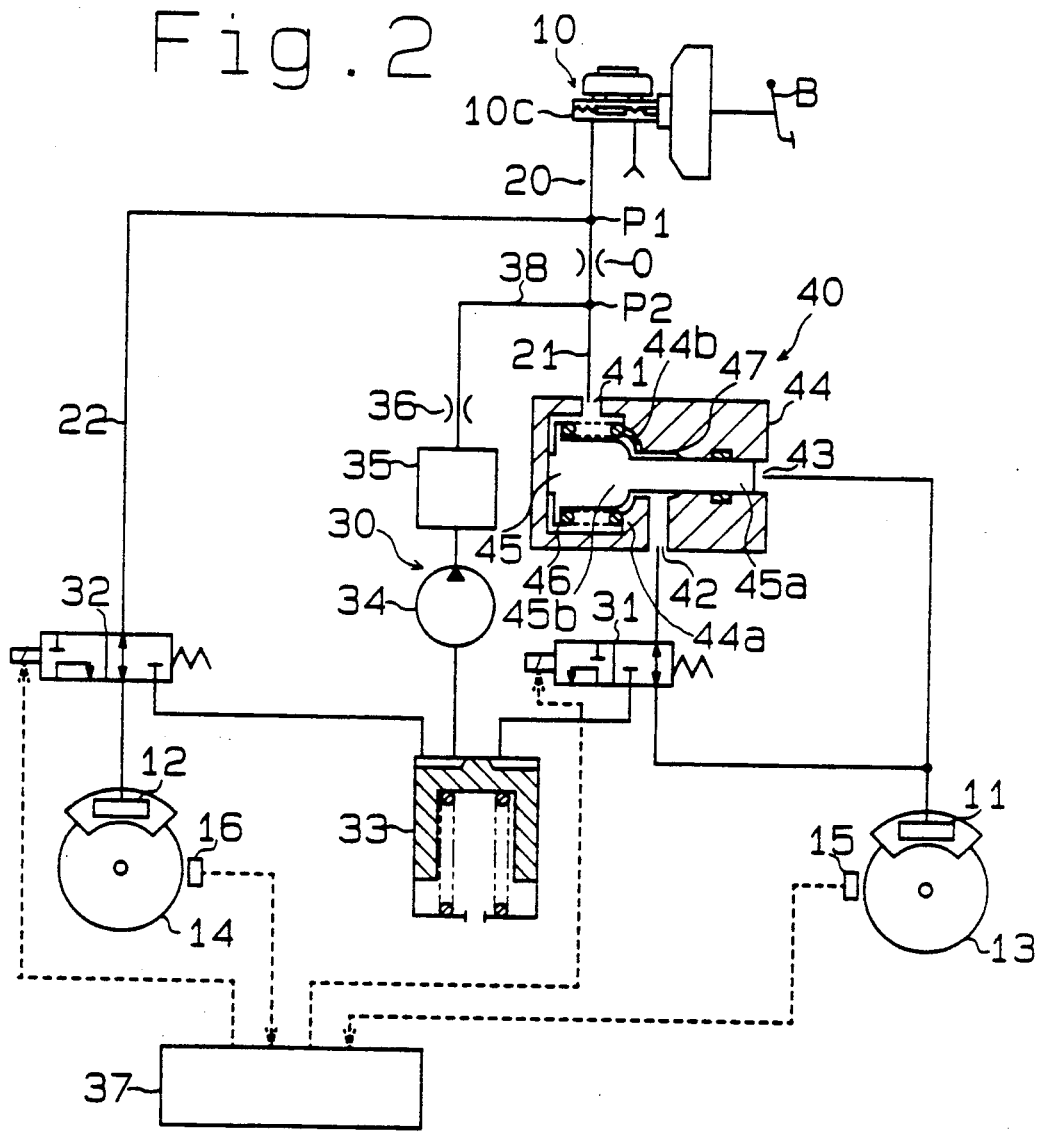
FIG. 2 is a schematic structural diagram showing another embodiment of the wheel braking control apparatus according to the present invention.

FIG. 2 illustrates another embodiment of the present invention. In the embodiment shown in FIG. 2, a flow control valve 40 is provided between the junction point P2 of the line 21 and the hydraulic switch valve 31. As the other structure is the same as that of the first embodiment shown in FIG. 1, like reference numerals are given to corresponding or identical members and their description will be omitted.

A housing 44 of the flow control valve 40 has an inlet port 41, an outlet port 42 and a pilot port 43, and has piston 45 installed therein. The inlet port 41 is connected to the side of the master cylinder 10, and the outlet port 42 to the side of the hydraulic switch valve 31. The pilot port 43 is connected to the wheel cylinder 11.

The piston 45 comprises a rod 45a and a head 45b. The rod 45a receives the fluid pressure on the master cylinder side given through the inlet port 41 and the fluid pressure on the wheel cylinder side given through the outlet port 42. The head 45b can fit in a shoulder 44a provided on the housing 44.

A passage 47, which permits the inlet port 41 to communicate with the outlet port 42, is formed between the piston 45 and housing 44.

The piston 45 is urged by a spring 46 in such a direction that the head 45b moves away from the shoulder 44a. When the difference between the fluid pressure on the master cylinder side and that on the wheel cylinder side is less than a set value, the head 45b moves away from the shoulder 44a as illustrated, thus opening the passage 47 between the inlet port 41 and outlet port 42. When the difference between the fluid pressure on the master cylinder side and that on the wheel cylinder side is equal to or greater than the set value, the head 45b fits in the shoulder 44a so that the inlet port 41 and outlet port 42 communicate with each other only through a groove 44b formed in the shoulder 44a, thus setting the passage 47 in a throttled state.

A description will now be given regarding the action of the wheel braking control apparatus for use in vehicles shown in FIG. 2.

When the fluid pressure in the wheel cylinder 11 drops at the time the ABS is working, the difference between the fluid pressure on the master cylinder side and that on the wheel cylinder side becomes equal to or greater than the set value. Consequently, the piston 45 moves against the urging force of the spring 46 and the head 45b fits in the shoulder 44a, thus throttling the flow through the control valve 40.

Accordingly, the throttling action of the flow control valve 40 in addition to that of the nozzle O limits the dropping of the pressure of pump-out fluid which is caused by a decrease in the fluid pressure on the side of the wheel cylinder 12. As a result, the difference between the fluid pressure on the wheel cylinder side and that of the master cylinder side in the flow control valve 40 is kept equal to or greater than the set value, and the flow control valve 40 remains throttled.

Accordingly, the flow control valve 40 will respectively be throttled or opened when the fluid pressure in the wheel cylinder 11 is increased or decreased. In this manner, the fluid pressure in the brake line 21 in the upstream of the valve 40 is properly controlled to eliminate the influence of this fluid pressure on the fluid pressure in the other brake line 22.

Further, the second embodiment produces the same effect as the first embodiment.

In the above embodiments, the present invention is applied to an apparatus for controlling pressure decrease and pressure increase in the fluid in the wheel cylinders 11 and 12 by means of the hydraulic switch valves 31 and 32. The present invention can also be applied to an apparatus for controlling the drop and surge of the pressure and maintaining the pressure level of the fluids in the wheel cylinders 11 and 12 by means of hydraulic supply valves and hydraulic discharge valves (refer to FIGS. 3,5 and 7 of Japanese Laid-Open Patent Application No. 64-74153).

Figure 3:
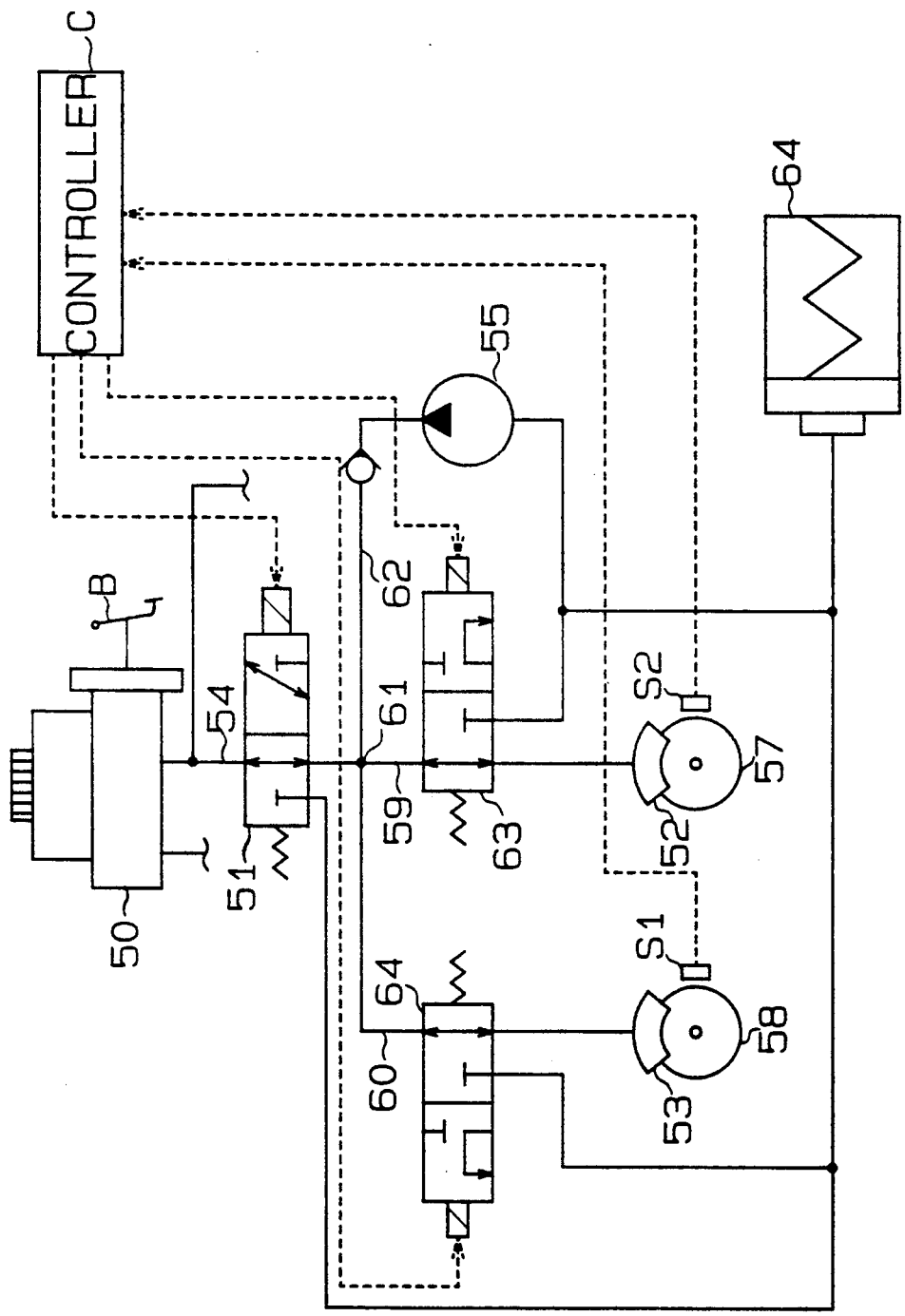
FIG. 3 is a diagram schematically exemplifying the structure of a conventional apparatus.

The present invention may also be applied to an apparatus having a traction control switch valve provided upstream of the dividing point P1, as per the prior art shown in FIG. 3.

As many apparently wide embodiments of this invention may be made without departing from the spirit and scope thereof, it is to be understood that the invention is not limits to the specific embodiments described herein, but rather is defined as set forth in the appended claims.

What is claimed is:

1. An anti-lock wheel braking control apparatus comprising:

brake applying means including brake applying hydraulic cylinders provided in association with a pair of wheels, for applying a braking force to each wheel;

pressure supplying means for supplying a pressurized fluid to the brake applying means;

a brake fluid circuit for coupling the pressure supplying means to the brake applying means, the brake fluid circuit being divided into two brake lines at a dividing point, the brake lines each having an end connected to the brake applying means;

a reservoir for receiving brake fluid;

a pair of line switching means, each line switching means being associated with a particular brake line for selectively alternatively coupling the brake applying means to the pressure supplying means and the reservoir;

a pressure compensation line connected between the reservoir and a first one of the brake lines at a junction point between the dividing point and the brake applying means for delivering fluid from the reservoir to the first brake line;

interference eliminating means, disposed between the dividing point and the junction, for reducing the coupling of pressure fluctuations between the two brake lines;

said pressure supplying means including a master cylinder;

said interference eliminating means including a nozzle provided between the dividing point and junction point; and said first brake line having a flow control valve for controlling a flow rate of a fluid flowing in said first brake line based on the difference between a fluid pressure on a master cylinder side and a fluid pressure on a brake applying hydraulic cylinder side, the flow control valve being disposed between the junction and the brake applying means.

2. The wheel braking control apparatus as claimed in claim 1, wherein a housing of the flow control valve has an inlet port connected to a master cylinder, an outlet port connected to a switch valve and a pilot port connected to the brake applying hydraulic cylinders, and a piston having a rod for receiving a fluid pressure on the master cylinder side and a fluid pressure on the brake applying hydraulic side and a head engageable on a shoulder provided on the housing against an urging force of a spring disposed in the housing, the piston being moved, based on the difference between the fluid pressure on the master cylinder side and that on the brake applying hydraulic cylinder side, to control a throttling of a line connecting the inlet port to the outlet port between the housing and piston on the basis of the amount of movement of the piston.

3. The wheel braking control apparatus as claimed in claim 2, wherein one of the brake applying hydraulic cylinders is for applying braking to a left side rear wheel and the other brake applying hydraulic cylinder is for applying braking to a right side front wheel.

4. A wheel braking control apparatus comprising:

a pair of brake applying hydraulic cylinders, provided in association with a pair of wheels, for applying a braking force to each wheel;

a master cylinder for supplying a pressurized fluid to the hydraulic cylinders;

a brake fluid circuit for coupling the master cylinder to the hydraulic cylinder, the brake fluid circuit being divided into two brake lines at a dividing point, the brake lines each having ends connected to an associated one of the brake applying hydraulic cylinders, respectively;

switch valves, respectively arranged on the brake lines, for selectively alternatively connecting the brake applying hydraulic cylinders to the master cylinder and a reservoir, a recirculation line connected to a first one of the brake lines at a junction point between its associated switch valve and the dividing point for supplying a fluid from the reservoir to the junction point to compensate for pressure fluctuation in said first brake line;

a constriction disposed between the dividing point and the junction point for reducing the coupling of pressure fluctuation between the two brake lines; and said first one of the brake lines being provided downstream of the junction point with a flow control valve for controlling a flow rate of a fluid flowing in that brake line based on the difference between a fluid pressure on a master cylinder side and a fluid pressure on a brake applying hydraulic cylinder side.

5. The wheel braking control apparatus as claimed in claim 4, wherein a housing of the flow control valve has an inlet port connected to said master cylinder, an outlet port connected to said switch valve and a pilot port connected to one of said brake applying hydraulic cylinders, and a piston having a rod for receiving a fluid pressure on the master cylinder side and a fluid pressure on the brake applying hydraulic cylinder side and a head fittable in a shoulder provided on the housing against an urging force of a spring disposed in the housing, said piston moved, based on the difference between the fluid pressure on the master cylinder side and that on the brake applying hydraulic cylinder side, to control a throttling of a line connecting the inlet port to the outlet port between the housing and piston on the basis of the amount of movement of the piston.

6. A wheel braking control apparatus comprising:
a master cylinder, connected to a brake pedal, for generating a hydraulic pressure corresponding to the amount of manipulation of the brake pedal;
first and second brake applying hydraulic cylinders driven by a hydraulic pressure for applying braking to left and right wheels, respectively;
a pressure transmission line having one end connected to the master cylinder and divided at a dividing point into two brake lines having free ends respectively connected to the first and second brake applying hydraulic cylinders;
an anti brake lock circuit including two switch valves provided in the brake lines downstream of the dividing point of the pressure transmission line, a reservoir for receiving fluid from the brake applying hydraulic cylinders, a pump for pressurizing the fluid in the reservoir and a discharge line for delivering the pressurized fluid from the reservoir to a junction point with a first brake line downstream of the dividing point and upstream of the associated switch valve;
a constriction disposed between the dividing point and junction point for preventing interference of hydraulic pressure of one of the brake lines with that of the other brake line;
said one of the brake lines being provided downstream of the junction point with a flow control valve for controlling a flow rate of a fluid flowing in that brake line based on the difference between a fluid pressure on a master cylinder side and a fluid pressure on a brake applying hydraulic cylinder side;
a housing of the flow control valve having an inlet port connected to the master cylinder, an outlet port connected to said associated switch valve and a pilot port connected to one of the brake applying hydraulic cylinders; and
a piston having a rod for receiving a fluid pressure on the master cylinder side and a fluid pressure on the brake applying hydraulic cylinder side and a head fittable in a shoulder provided on the housing against an urging force of a spring disposed in the housing, said piston being moved based on the difference between the fluid pressure on the master cylinder side and that on the brake applying hydraulic cylinder side, to control a throttling line connecting the inlet port to the outlet port between the housing and piston on the basis of the amount of movement of the piston.

* * * * *